US012697904B2

(12) United States Patent (10) Patent No.: US 12,697,904 B2
Mikita et al. (45) Date of Patent: Aug. 4, 2026

(54) VEHICLE SEAT

(71) Applicants: NHK SPRING CO., LTD., Yokohama (JP); SUBARU CORPORATION, Tokyo (JP)

(72) Inventors: Yukinori Mikita, Yokohama (JP); Kensuke Yoshiga, Yokohama (JP); Fumito Kitanaka, Tokyo (JP); Masafumi Takano, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 134 days.

(21) Appl. No.: 18/483,372

(22) Filed: Oct. 9, 2023

(65) Prior Publication Data

US 2024/0116407 A1 Apr. 11, 2024

(30) Foreign Application Priority Data

Oct. 11, 2022 (JP) ................................. 2022-163570

(51) Int. Cl.
*B60N 2/22* (2006.01)
(52) U.S. Cl.
CPC .................................. *B60N 2/2218* (2013.01)
(58) Field of Classification Search
CPC .......... B60N 2/2218; B60N 2/22; B60N 2/20; B60N 2/2222; B60N 2/02; B60N 2/005

USPC .............. 297/216.1, 216.15, 216.16, 216.17, 297/216.18, 216.19, 216.2, 258.1, 259.1, 297/259.2, 353, 354.1, 354.12, 354.13, 297/361.1, DIG. 7
See application file for complete search history.

(56) References Cited

U.S. PATENT DOCUMENTS

2015/0306990 A1* 10/2015 Nakagawa ............. B60N 2/682
297/452.1
2017/0341537 A1* 11/2017 Suzuki ............... B60N 2/02246

FOREIGN PATENT DOCUMENTS

JP 6916232 B2 8/2021

* cited by examiner

*Primary Examiner* — Justin V Lewis
(74) *Attorney, Agent, or Firm* — Knobbe, Martens, Olson & Bear, LLP

(57) ABSTRACT

A vehicle seat includes a hinge cover that is disposed at aside portion of a seat cushion and has an opening through which a recliner shaft of a recliner provided between the seat cushion and a seat back passes, and a reclining lever that is disposed at an outer side in a seat width direction with respect to the hinge cover and is rotatable about the recliner shaft to unlock the recliner. A part of an edge portion of the opening of the hinge cover is provided with a facing portion that protrudes further toward the recliner shaft side than another portion of the edge portion and faces the recliner shaft in proximity.

2 Claims, 3 Drawing Sheets

VEHICLE SEAT

CROSS-REFERENCE TO RELATED APPLICATION

This application is based on and claims priority under 35 USC 119 from Japanese Patent Application No. 2022-163570, filed on Oct. 11, 2022, the disclosure of which is incorporated by reference herein.

BACKGROUND

Technical Field

The present disclosure relates to a vehicle seat.

Related Art

A vehicle seat described in Japanese Patent No. 6916232 includes a reclining lever (reclining lever) that releases a lock of a reclining device (recliner) by being rotated, a reclining cover (hinge cover) provided on a side portion of a seat cushion inside a vehicle with respect to the reclining lever, a seat belt disposed at a position in contact with the reclining lever when an occupant wears the seat belt, a protrusion protruding from the reclining lever toward the inside of the vehicle, and a recess formed on a surface on the vehicle outer side of the hinge cover. When the vehicle collides, a load is input from the seat belt to the reclining lever, so that the protrusion of the reclining lever is engaged with the recess of the hinge cover, and the rotation of the reclining lever is restricted. This prevents the recliner from being unlocked unintentionally.

SUMMARY

In the above prior art, it is not considered that the lock of the recliner is released by the load input from the seat belt or the like to the hinge cover at the time of vehicle collision.

In view of the above fact, an object of the present disclosure is to provide a vehicle seat capable of preventing a recliner from being unlocked by a load input from a seat belt or the like to a hinge cover at the time of vehicle collision.

A vehicle seat according to a first aspect of the present disclosure includes: a hinge cover that is disposed at a side portion of a seat cushion and has an opening through which a shaft of a recliner provided between the seat cushion and a seat back passes; and a reclining lever that is disposed at an outer side in a seat width direction with respect to the hinge cover and is rotatable about the shaft to unlock the recliner, in which a part of an edge portion of the opening is provided with a facing portion that protrudes further toward a shaft side than another portion of the edge portion and is proximate to and faces the shaft.

According to the vehicle seat of the first aspect, the hinge cover disposed at the side portion of the seat cushion has the opening through which the shaft of the recliner provided between the seat cushion and the seat back passes. The reclining lever disposed at the outer side in the seat width direction with respect to the hinge cover is rotatable about the shaft of the recliner to unlock the recliner. A part of the edge portion of the opening is provided with a facing portion that protrudes further toward the shaft side of the recliner than another portion of the edge portion and is proximate to and faces the shaft. In this vehicle seat, when a load is input to the hinge cover from a seat belt or the like at the time of vehicle collision and the hinge cover is displaced in the radial direction with respect to the recliner shaft, the facing portion can be configured to come into contact with the shaft. Since the displacement of the hinge cover can be limited by this contact, it is possible to prevent the recliner from being unintentionally unlocked by the displacement of the hinge cover.

In a vehicle seat according to a second aspect, in the first aspect, the facing portion and the shaft face each other on their respective surfaces.

In the vehicle seat of the second aspect, the facing portion provided in a part of the edge portion of the opening of the hinge cover and the shaft of the recliner face each other on their respective surfaces. Therefore, when the hinge cover is displaced in the radial direction with respect to the shaft of the recliner, the facing portion and the shaft can be brought into contact with each other on their respective surfaces. This makes it possible to favorably limit the displacement of the hinge cover.

In a vehicle seat according to a third aspect, in the first aspect or the second aspect, the facing portion faces the shaft from at least a seat upper side and a seat rear side.

According to the vehicle seat of the third aspect, the facing portion provided in the part of the edge portion of the opening of the hinge cover faces the shaft of the recliner from at least the seat upper side and the seat rear side. Therefore, when the hinge cover is displaced to the seat lower side and the seat front side by the load from the seat belt at the time of vehicle collision, the facing portion comes into contact with the shaft. As a result, the displacement of the hinge cover due to the load from the seat belt can be favorably limited.

As described above, according to the vehicle seat according to the present disclosure, it is possible to prevent the recliner from being unlocked by the load input from the seat belt or the like to the hinge cover at the time of vehicle collision.

BRIEF DESCRIPTION OF THE DRAWINGS

Exemplary embodiments of the present invention will be described in detail based on the following figures, wherein.

DETAILED DESCRIPTION

Figure 1:
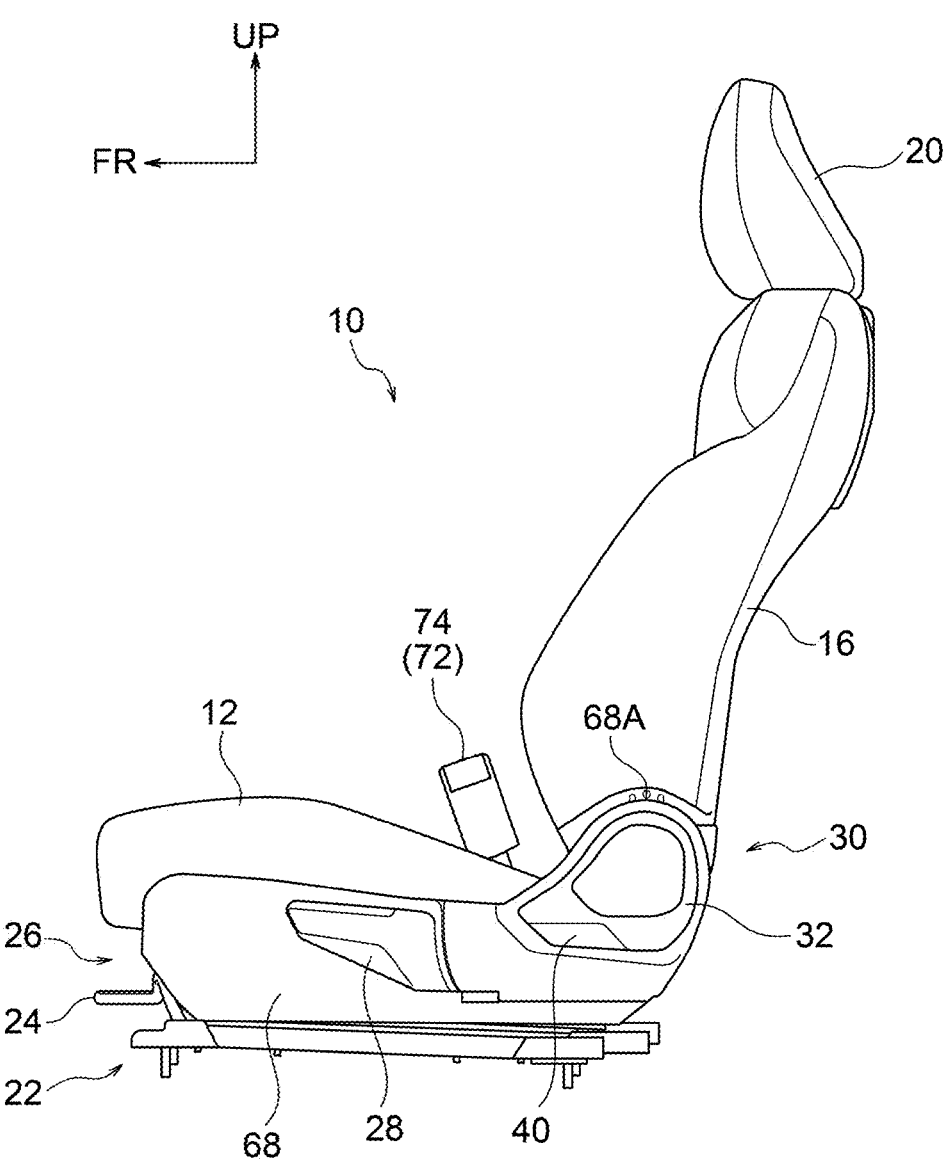
FIG. 1 is a side view illustrating a vehicle seat according to an embodiment.

Hereinafter, a vehicle seat 10 according to an embodiment of the present disclosure will be described with reference to FIGS. 1 to 3. Note that in each drawing, some reference numerals may be omitted in order to make the drawing easy to see. Arrows FR, LH, and UP appropriately described in the drawings indicate front, left, and upper sides of the vehicle seat 10, respectively. Hereinafter, when the description is simply made using the front-rear, left-right, and up-down directions, directions with respect to the vehicle seat 10 are indicated.

As illustrated in FIG. 1, a vehicle seat 10 according to the present embodiment includes a seat cushion 12 on which an occupant is seated, a seat back 16 that supports a back of the occupant, and a headrest 20 that supports a head of the occupant. The seat cushion 12 is connected to a floor (not illustrated) of a vehicle body via a known seat slide mechanism 22 and a lifter mechanism 26. The seat back 16 is connected to the seat cushion 12 via a known reclining mechanism 30. The front-rear, left-right, and up-down directions of the vehicle seat 10 coincide with the front-rear, left-right, and up-down directions of the vehicle. The vehicle seat 10 is a left front seat of the vehicle. When the vehicle seat 10 is a right front seat of the vehicle, the configuration is bilaterally symmetrical with that of the present embodiment.

An occupant seated on the seat cushion 12 of the vehicle seat 10 is restrained on the vehicle seat 10 by a known three-point seat belt device 72. The seat belt device 72 includes a buckle 74 disposed at a right side of the seat cushion 12. Although not illustrated, in the seat belt device 72, one longitudinal end portion of the seat belt is locked to a spool of a retractor provided at a lower end portion of a center pillar of the vehicle, and the other longitudinal end portion of the seat belt is locked to a floor of a vehicle body on the left side of the seat cushion 12. When the occupant seated on the seat cushion 12 couples a tongue plate provided at a longitudinal intermediate portion of the seat belt to the buckle 74, the occupant is in the state of wearing the seat belt.

A slide lever 24 for unlocking the seat slide mechanism 22 is provided on the lower side of the front portion of the seat cushion 12. A hinge cover 68, a lifter lever 28, and a reclining lever 32 are provided on a left side portion of the seat cushion 12. The hinge cover 68, the lifter lever 28, and the reclining lever 32 are manufactured by, for example, resin injection molding. The hinge cover 68 has an elongated shape whose longitudinal direction is the front-rear direction and whose thickness direction is the left-right direction. The length of the hinge cover 68 in the front-rear direction is set to be equal to the length of the seat cushion 12 in the front-rear direction. The seat slide mechanism 22, the lifter mechanism 26, and the reclining mechanism 30 are covered with the hinge cover 68 from the left side.

The lifter lever 28 has an elongated shape whose longitudinal direction is the front-rear direction and whose thickness direction is the left-right direction, and is disposed at a front-rear center portion of the hinge cover 68. The rear end portion of the lifter lever 28 is connected to the lifter mechanism 26 on the right side (inner side in the seat width direction) of the hinge cover 68. A vertical position of the seat cushion 12 with respect to the floor of the vehicle body is adjusted by vertically rotating the lifter lever 28.

The reclining lever 32 has a substantially trapezoidal shape when viewed from the left-right direction and has a dish shape opened toward the right side (inner side in the seat width direction), and is disposed at the rear portion of the hinge cover 68. An upward extending portion 68A extending upward is provided in the rear portion of the hinge cover 68. The upward extending portion 68A covers the recliner 46 (see FIGS. 2 and 3) of the reclining mechanism 30 from the left side (the outer side in the seat width direction). A main body portion 48 of the recliner 46 has a disk shape whose axial direction is the left-right direction, and is disposed between the rear end portion of the cushion frame 14 configuring the skeleton of the seat cushion 12 and the lower end portion of the back frame 18 configuring the skeleton of the seat back 16.

A recliner shaft 50 whose axial direction is the left-right direction is provided in an axial center portion of the main body portion 48 of the recliner 46. The recliner shaft 50 corresponds to a "shaft" in the present disclosure. An unlocking plate 52 for unlocking the recliner 46 is attached to the recliner shaft 50.

Figure 2:
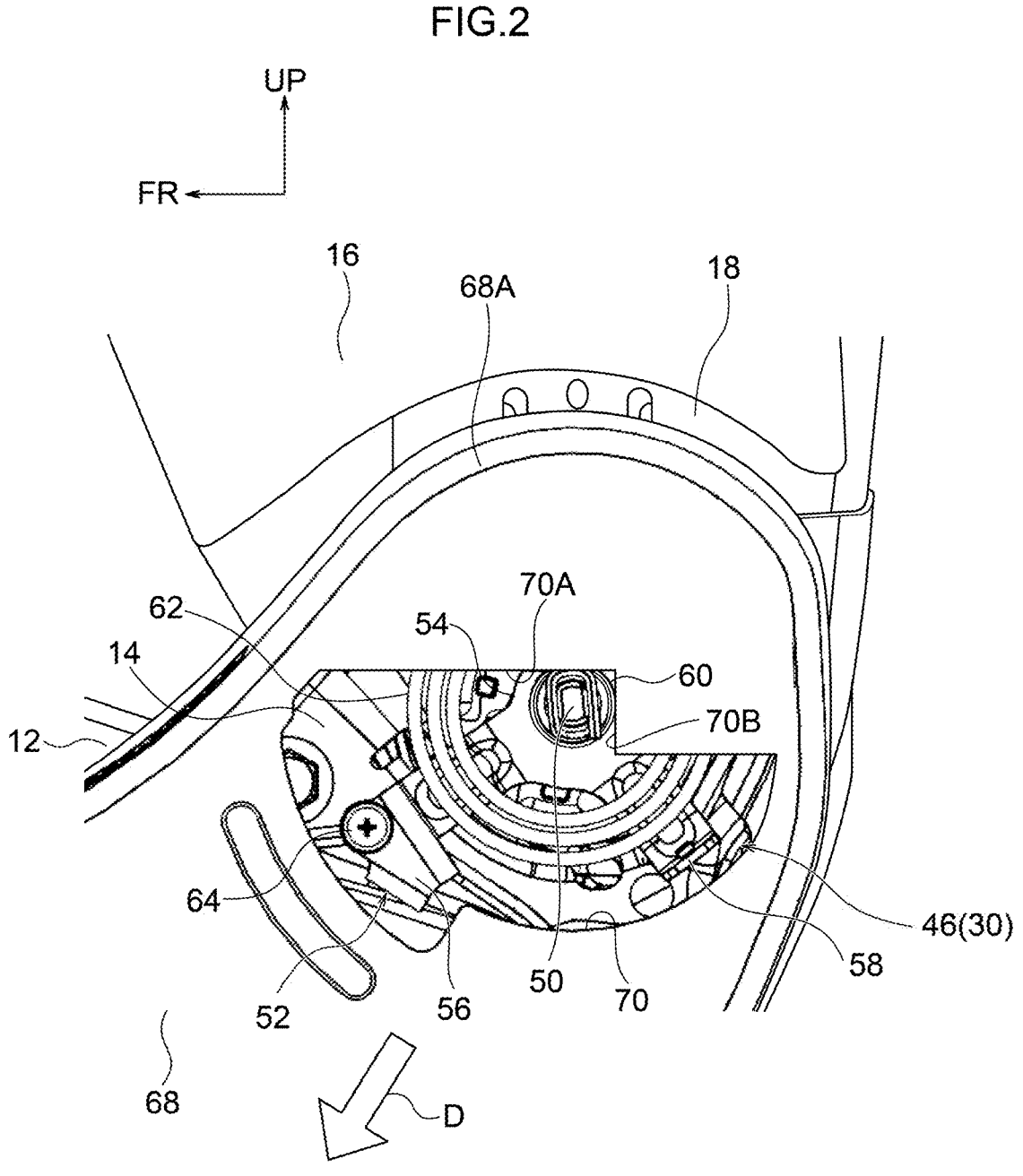
FIG. 2 is a side view illustrating a configuration around a recliner in the vehicle seat according to the embodiment.

The unlocking plate 52 is manufactured by, for example, press-molding a metal plate material, and has an L shape when viewed from the left-right direction as illustrated in FIG. 2. The unlocking plate 52 includes a shaft fixing portion 54 fixed to the recliner shaft 50, a forearm portion 56 extending in the front side and the lower side from the shaft fixing portion 54, and a rear arm portion 58 extending rearward and downward from the shaft fixing portion 54. The recliner shaft 50 passes the shaft fixing portion 54, and the shaft fixing portion 54 is fixed to the recliner shaft 50 by welding or the like.

When the unlocking plate 52 is rotated clockwise in FIG. 2 about the recliner shaft 50, the recliner 46 is unlocked, and a reclining angle of the seat back 16 with respect to the seat cushion 12 can be adjusted. The back frame 18 is biased in a rising direction with respect to the cushion frame 14 by a torsion spring 62 illustrated in FIG. 2.

An opening 70 through which the recliner shaft 50 passes is formed in the upward extending portion 68A of the hinge cover 68. The opening 70 is formed in a region facing the unlocking plate 52 and the torsion spring 62 in the left-right direction. An upper edge portion of the opening 70 is formed in a substantially arc shape concentric with the recliner shaft 50. A reclining lever 32 is disposed at the left side (outer side in the seat width direction) of the upward extending portion 68A, and the opening 70 is covered with the reclining lever 32.

Figure 3:
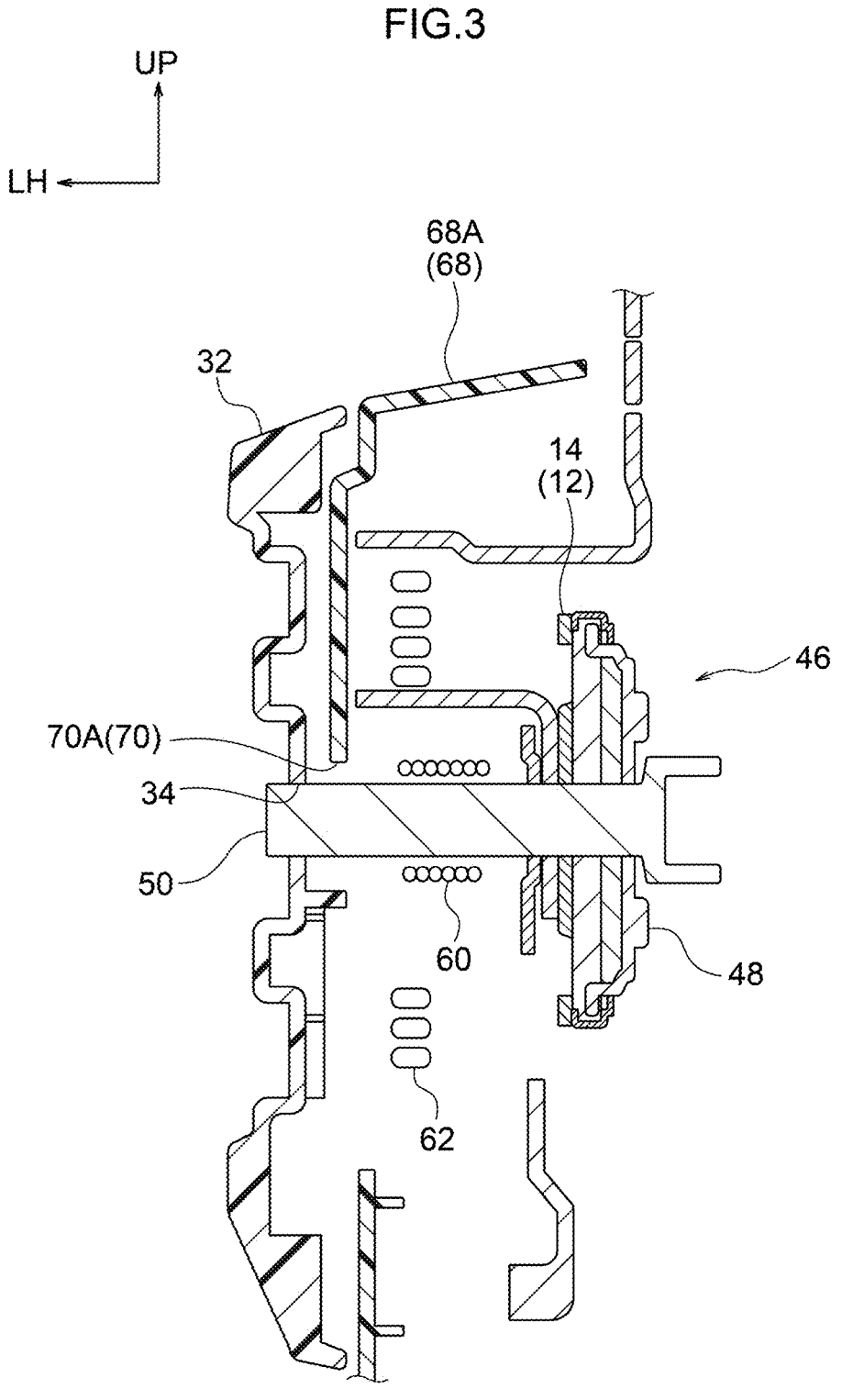
FIG. 3 is a cross-sectional view illustrating a configuration around a recliner in the vehicle seat according to the embodiment.

As illustrated in FIG. 3, a through-hole 34 is formed in a center portion of the reclining lever 32. A distal end portion of the recliner shaft 50 is inserted into the through-hole 34. The distal end portion of the forearm portion 56 of the unlocking plate 52 is fixed to the front side of the reclining lever 32 on the lower side of the through-hole 34 by screwing. A fitting portion (not illustrated) in which the distal end portion of the rear arm portion 58 of the unlocking plate 52 is fitted is provided on the rear side of the reclining lever 32 on the lower side of the through-hole 34. The distal end portion of the rear arm portion 58 is bent toward the left side (the outer side in the seat width direction), and is fitted to the fitting portion from the right side (the inner side in the seat width direction). The reclining lever 32 is integrated with the recliner 46, and is not movable relative to the cushion frame 14 of the seat cushion 12 in the radial direction of the recliner shaft 50.

As illustrated in FIG. 1, a recess 40 recessed to the right side (the inner side in the seat width direction) is formed at the lower end portion of the front portion of the reclining lever 32. When the occupant seated on the seat cushion 12 hooks the left hand finger into the recess 40 and lifts the reclining lever 32 upward, the reclining lever 32 rotates about the recliner shaft 50 integrally with the unlocking plate 52. As a result, the recliner 46 is unlocked. When the occupant stops the lifting operation, the recliner shaft 50, the unlocking plate 52, and the reclining lever 32 return to the original positions by the biasing force of a torsion coil spring 60 illustrated in FIG. 2, and the recliner 46 is locked again.

As illustrated in FIGS. 2 and 3, a part of the edge portion of the opening 70 of the hinge cover 68 is provided with an upper facing portion 70A and a rear facing portion 70B that protrude toward the recliner shaft 50 than another portion of the edge portion of the opening 70. The upper facing portion 70A faces the recliner shaft 50 from the upper side in proximity, and the rear facing portion 70B faces the recliner shaft 50 from the rear side in proximity. The upper facing portion 70A and the recliner shaft 50 face each other on their respective surfaces. Similarly, the rear facing portion 70B and the recliner shaft 50 face each other on their respective surfaces. A gap between the upper facing portion 70A and the recliner shaft 50 and a gap between the rear facing portion 70B and the recliner shaft 50 are both set to about several millimeters. The upper facing portion 70A and the rear facing portion 70B correspond to "facing portions" in the present disclosure.

Next, actions and effects of the present embodiment will be described.

According to the vehicle seat 10 having the above configuration, the hinge cover 68 disposed at the side portion of the seat cushion 12 has the opening 70 through which the recliner shaft 50 of the recliner 46 provided between the seat cushion 12 and the seat back 16 passes. The reclining lever 32 disposed at the outer side in the seat width direction with respect to the hinge cover 68 is rotatable about the recliner shaft 50 to unlock the recliner 46. In a part of the edge portion of the opening 70 of the hinge cover 68, the facing portions 70A and 70B that protrude toward the recliner shaft 50 side than another portion of the edge portion and face the recliner shaft 50 in proximity are provided.

Therefore, when the seat belt or the like comes into contact with the hinge cover 68 at the time of vehicle collision, a load is input to the hinge cover 68, and the hinge cover 68 is displaced to the front side and the lower side with respect to the recliner shaft 50 (see an arrow D in FIG. 2), the facing portions 70A and 70B come into contact with the shaft 50. As a result, since the displacement of the hinge cover 68 can be limited, it is possible to prevent the recliner 46 from being unintentionally unlocked by the displacement of the hinge cover 68. That is, when the displacement of the hinge cover 68 is not limited, the hinge cover 68 may come into contact with the forearm portion 56 or the rear arm portion 58 of the unlocking plate 52, and the unlocking plate 52 may rotate in an unlocking direction of the recliner 46. In this case, the recliner 46 is unlocked at a timing that is not in accordance with the intention of the occupant, but this can be avoided in the present embodiment.

In the present embodiment, the facing portions 70A and 70B provided in a part of the edge portion of the opening 70 of the hinge cover 68 and the recliner shaft 50 face each other on their respective surfaces. Therefore, when the hinge cover 68 is displaced in the radial direction with respect to the shaft 50 of the recliner, the facing portions 70A and 70B and the recliner shaft 50 can be brought into contact with each other on their respective surfaces. This makes it possible to favorably limit the displacement of the hinge cover 68.

Furthermore, in the present embodiment, the facing portions 70A and 70B provided in a part of the edge portion of the opening 70 of the hinge cover 68 face the recliner shaft

50 from the upper side and the rear side. Therefore, when the hinge cover 68 is displaced to the lower side and the front side due to the load from the seat belt at the time of vehicle collision, the facing portions 70A and 70B come into contact with the recliner shaft 50. As a result, the displacement of the hinge cover 68 due to the load from the seat belt can be favorably limited.

In the above embodiment, the facing portions 70A and 70B provided in a part of the edge portion of the opening 70 of the hinge cover 68 face the recliner shaft 50 from the upper side and the rear side, but the present disclosure is not limited thereto. The facing portion provided in a part of the edge portion of the opening of the hinge cover may face the shaft of the recliner also from the front side or the lower side.

In the above embodiment, the facing portions 70A and 70B and the recliner shaft 50 face each other on their respective surfaces. However, the present disclosure is not limited thereto, and the facing portions 70A and 70B and the recliner shaft 50 may face each other in a plural lines or points.

In addition, the present disclosure can be variously modified without departing from the gist thereof. It is a matter of course that the scope of rights of the present disclosure is not limited to the above embodiments.

What is claimed is:

1. A vehicle seat, comprising:

a hinge cover that is disposed at a side portion of a seat cushion and has an opening through which a recliner shaft is provided between the seat cushion and a seat back passes; and a reclining lever that is disposed at an outer side of the hinge cover in a seat width direction and is rotatable about the recliner shaft to unlock the recliner, wherein a portion of an edge portion of the opening is provided with a facing portion that protrudes further toward the recliner shaft than another portion of the edge portion excluding said portion of the edge portion and is proximate to and faces the recliner shaft, wherein the opening of the hinge cover is covered from the outer side of the hinge cover in the seat width direction by the reclining lever, wherein the facing portion faces the recliner shaft from at least a seat upper side and a seat rear side, when a seat belt contacts the hinge cover at a time of a vehicle collision, a load is input to the hinge cover, and the hinge cover is configured to be displaced to a front side and a lower side with respect to the recliner shaft, and the facing portion is configured to contact the recliner shaft.

2. The vehicle seat according to claim 1, wherein a surface of the facing portion and a surface of the recliner shaft face each other.

* * * * *